(12) United States Patent
Hu et al.

(10) Patent No.: US 7,403,534 B2
(45) Date of Patent: Jul. 22, 2008

(54) METHOD OF IMPLEMENTING IP TELEPHONE GATEKEEPER GROUP AND GATEKEEPER SYSTEM

(75) Inventors: Kewen Hu, Shenzhen (CN); Ligang Wang, Shenzhen (CN); Qing Zeng, Shenzhen (CN); Yi Ji, Shenzhen (CN); Haoliang Qin, Shenzhen (CN); Jian Ying, Shenzhen (CN); Wenjun Zhao, Shenzhen (CN); Huailin Yuan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 674 days.

(21) Appl. No.: 10/481,136

(22) PCT Filed: Jun. 6, 2002

(86) PCT No.: PCT/CN02/00397

§ 371 (c)(1),
(2), (4) Date: Jul. 27, 2004

(87) PCT Pub. No.: WO02/003969

PCT Pub. Date: Dec. 27, 2002

(65) Prior Publication Data

US 2004/0264509 A1    Dec. 30, 2004

(30) Foreign Application Priority Data

Jun. 14, 2001 (CN) .................. 01 1 22203

(51) Int. Cl.
*H04L 12/28* (2006.01)
*H04L 12/66* (2006.01)
*H04J 3/06* (2006.01)

(52) U.S. Cl. .................. 370/401; 370/353; 370/503
(58) Field of Classification Search .............. None
See application file for complete search history.

(56) References Cited

U.S. PATENT DOCUMENTS 6,229,804 B1    5/2001   Mortsolf et al. ............ 370/352
6,363,065 B1 *  3/2002   Thornton et al. ............ 370/352

FOREIGN PATENT DOCUMENTS

EP    1 014 633 A2    6/2000
WO    01/20846 A2    3/2001

* cited by examiner

*Primary Examiner*—Aung S. Moe
*Assistant Examiner*—Tung Q Tran
(74) *Attorney, Agent, or Firm*—Ladas & Parry LLP

(57) ABSTRACT

The present invention provides an IP telephone gatekeeper system and an implementation method thereof, characterized in that two or more individual gatekeepers are connected each other, so as to forming a gatekeeper system that can be regarded as a single gatekeeper system by the controlled gateways, in which the gatekeepers can substitute and backup mutually. A plurality of computer systems are used to realized the cooperation of a plurality of gatekeepers, for breaking through the limit of capacity of individual gatekeeper group and improving the reliability of the whole system, so that backing-up and substituting mutually can be achieved.

7 Claims, 4 Drawing Sheets

METHOD OF IMPLEMENTING IP TELEPHONE GATEKEEPER GROUP AND GATEKEEPER SYSTEM

FIELD OF THE INVENTION

The present invention relates to an IP telephone gatekeeper method and the devices thereof, in particular to a gatekeeper system composed of multiple individual gatekeepers and the implementation method thereof.

BACKGROUND OF THE INVENTION

Currently, gatekeepers in most commercial IP telephone systems are implemented solely with software. Usually, a gatekeeper runs on a high-performance computer system under Windows or Unix OS. So a gatekeeper manages several subordinate gateway systems and provides bandwidth management, access control, address resolution, and zone management for the gateway systems. For each gateway registered to it, the gatekeeper has to manage it with certain resources; hence the gatekeeper is limited to its capacity. Currently, most gatekeeper software is designed to run on a single computer system, which limits the capacity of the gatekeeper. In addition, once the gatekeeper is out of service due to malfunction, calls to all gateways registered on it will be affected, resulting in severe service accident. Therefore, it is an important method to provide replaceable gatekeeper for enhancement of system reliability.

SUMMARY OF THE INVENTION

An object of the present invention is to provide a method of implementing an IP telephone gatekeeper system, which not only breaks through the capacity limitation of individual gatekeeper but also improves the reliability of the system, and gatekeepers in the system can mutually backup or substitute.

Another object of the present invention is to provide a gatekeeper system that implements said method of implementing gatekeeper system.

To attain the objects of the present invention, according to the method of implementing IP telephone gatekeeper system of the present invention, two or more gatekeepers are connected to each other, so as to form a whole gatekeeper group which is regarded as a single gatekeeper system by the controlled gateways, in which the gatekeepers can substitute and backup mutually, said method mainly comprises the following steps:

1) synchronizing the data of the gatekeepers in the gatekeeper group is kept synchronous by means of synchronization;

2) transferring the status variation of the gateways controlled by the gatekeeper group among the gatekeepers in the gatekeeper group for synchronization;

3) Mapping from a single gatekeeper name of the gatekeeper group to multi-gatekeepers in the gatekeeper group.

To attain another object of the present invention, the present invention provides a gatekeeper system, in which two or more gatekeepers are connected to each other, so as to form a whole gatekeeper group which is regarded as a single gatekeeper system by the controlled gateways, and in which the gatekeepers can substitute and backup mutually.

According to the present invention, multiple gatekeepers are connected to form a gatekeeper group, so that the data capacity of the whole gatekeeper group can be effectively increased, and the capacity limitation caused by networking of individual gatekeepers can be broken through, at the same time the data of respective gatekeepers is dynamically and synchronously connected to other gatekeepers in the gatekeeper group to avoid the waste of network bandwidth during data transmission. In addition, backing-up and substituting mutually can be achieved, which can avoid the failure of calls to all gateways registered on it once some gatekeeper is out of service due to malfunction. Therefore, the reliability of the gatekeeper system can be improved effectively. In addition, the whole gatekeeper system utilizes a common domain name, thus it is regarded as a single gatekeeper by the controlled gateways. And the gatekeeper system utilizes the domain name resolution system to translate the common domain name into network transmission addresses corresponding to a plurality of gatekeepers so as to implement automatic switchover to gatekeepers, so that the gateway can obtain a list of transmission addresses of the gatekeepers and choose the gatekeeper with highest priority to send a (Gatekeeper Request) GRQ message to it and choose a gatekeeper with lower load to send a (Register Request) RRQ message to it according to load condition. In this way, not only mapping from a single gatekeeper name of gatekeeper group to the gatekeepers but also smooth scalability of the gatekeeper group can be implemented, which is advantageous for balanced registration for the members in the gatekeeper group.

BRIEF DESCRIPTION OF THE DRAWINGS

The method and principle of the present invention is described in further detail with reference to the attached drawings.

DETAILED DESCRIPTION OF THE EMBODIMENT

Figure 1:
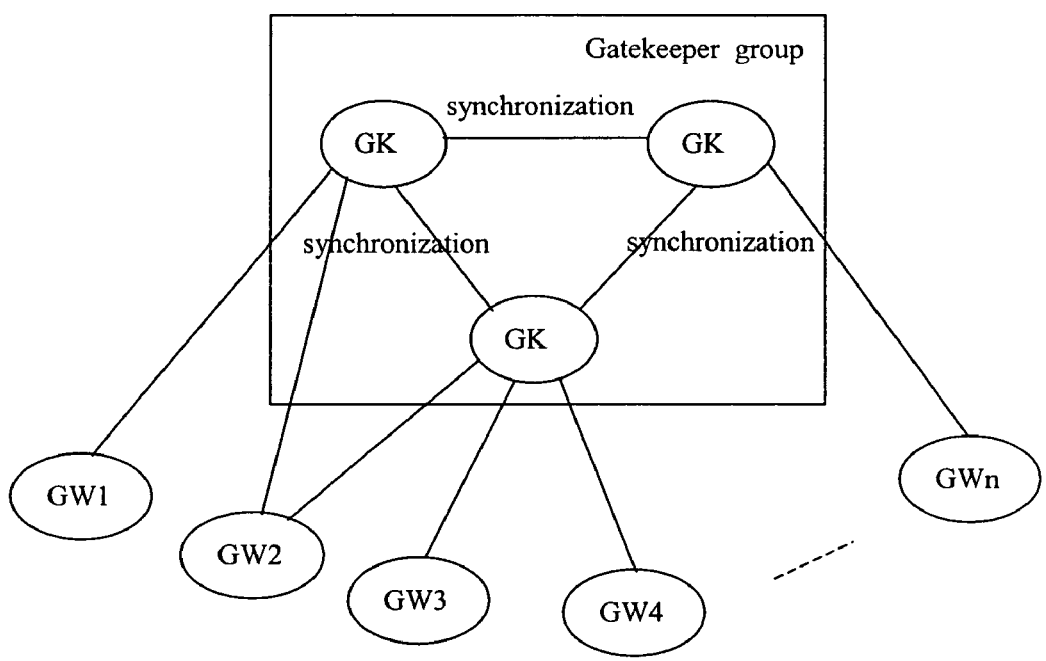
FIG. 1 is the diagram of composition of the present invention.
Figure 2:
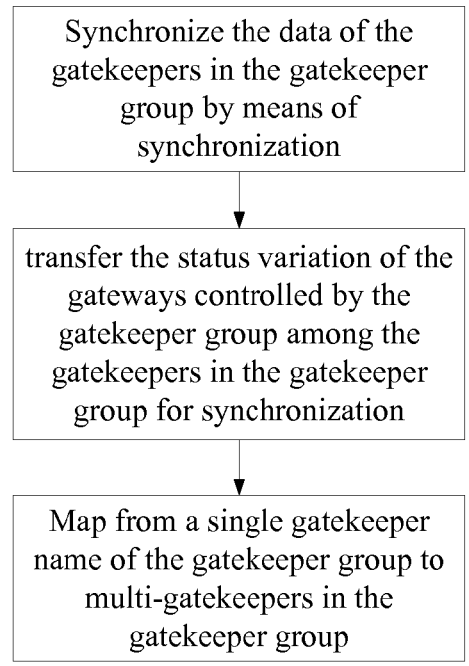
FIG. 2 is a schematic diagram illustrating a method of implementing IP telephone gatekeeper system according to an embodiment disclosed herein.
Figure 3:
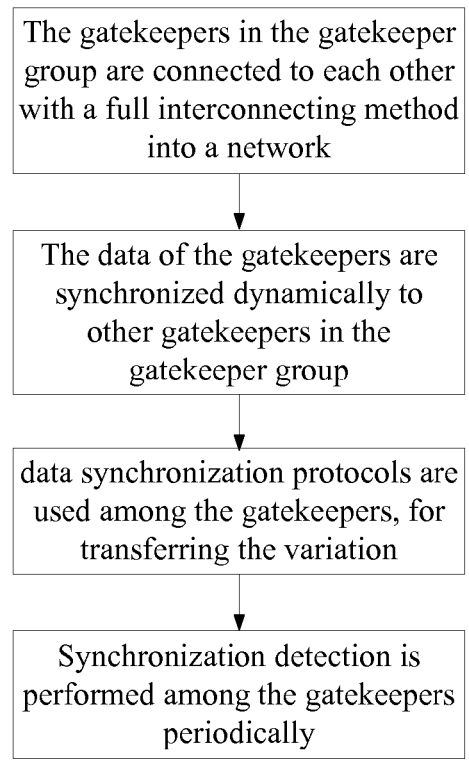
FIG. 3 is a flow chart showing a process of synchronizing the data of the gatekeepers in a gateway group according to an embodiment disclosed herein.
Figure 4:
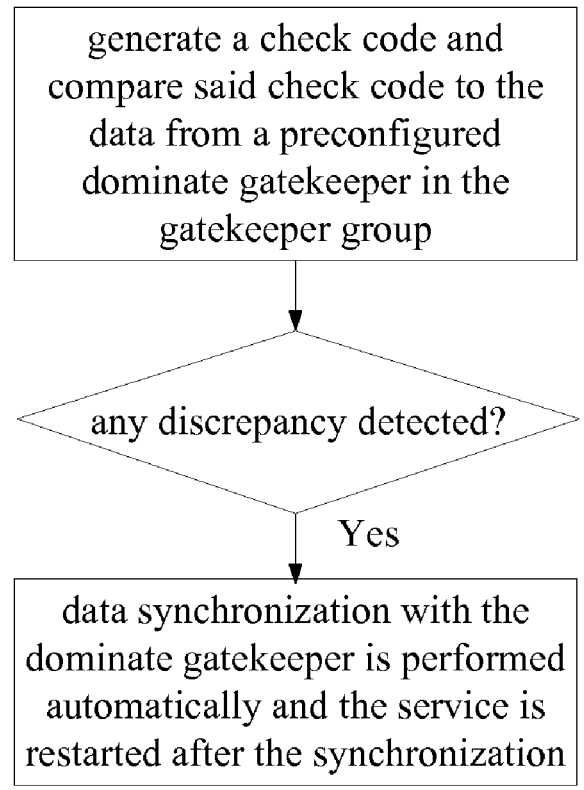
FIG. 4 is a flow chart showing a process of periodical synchronization detection among gatekeepers according to an embodiment disclosed herein.
Figure 5:
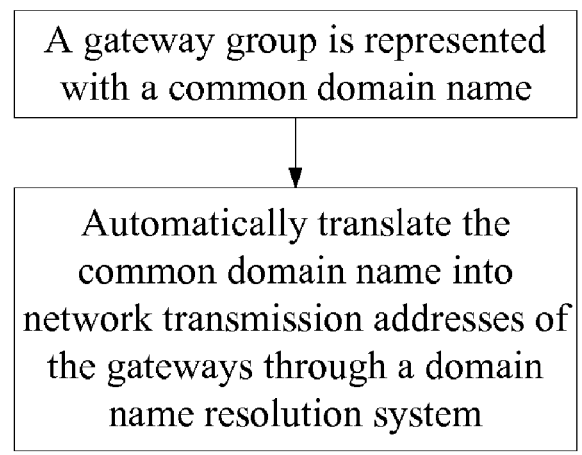
FIG. 5 is a schematic diagram illustrating the mapping from a single gatekeeper name to multi-gatekeepers according to an embodiment disclosed herein.
Figure 6:
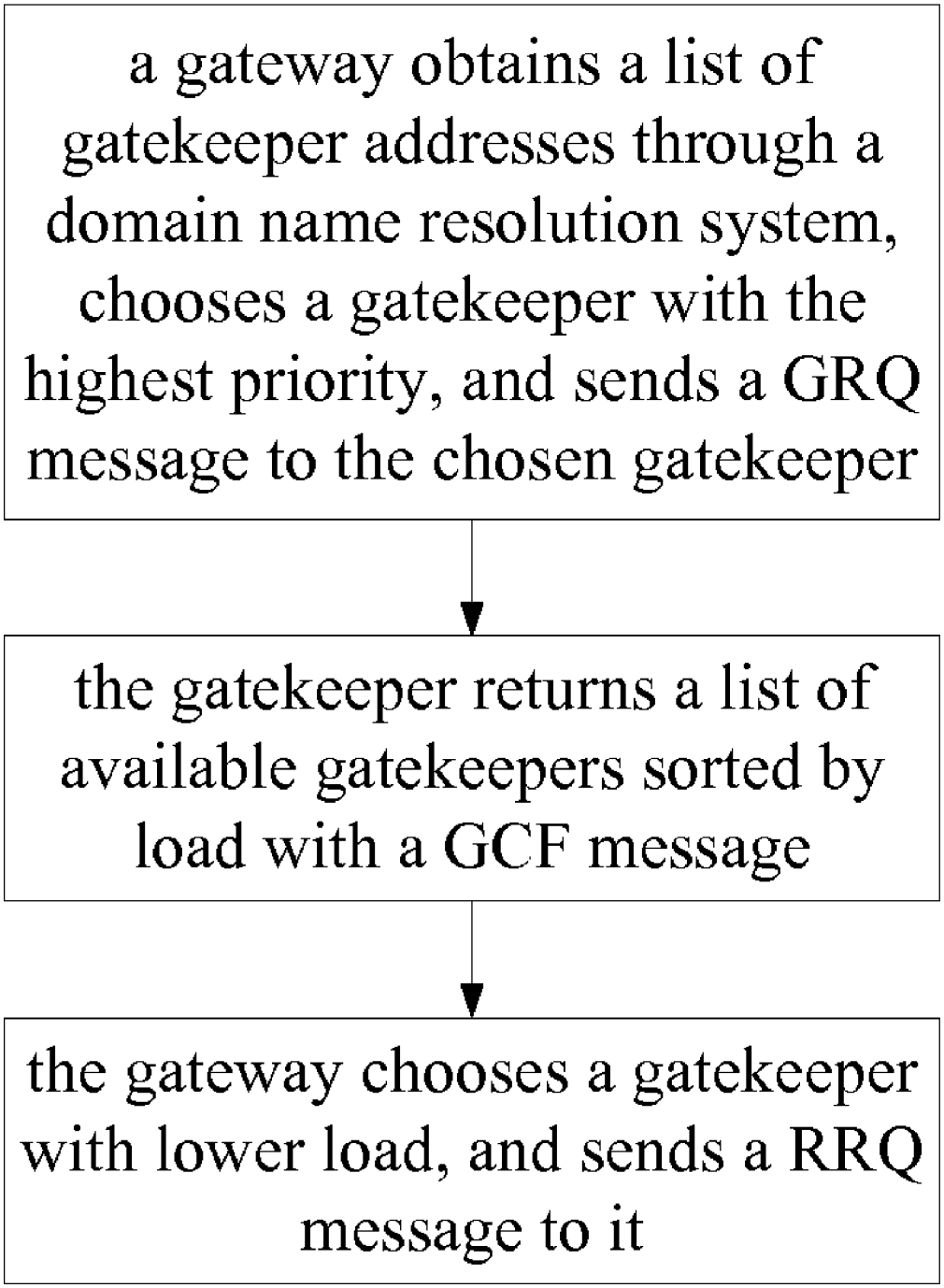
FIG. 6 is a schematic diagram illustrating a process of mapping from a single gatekeeper name to multi-gatekeepers according to an embodiment disclosed herein.

As shown in FIG. 1, according to the present invention, two or more gatekeepers are connected to each other, so as to form a whole gatekeeper group which is regarded as a single gatekeeper system by the controlled gateways, in which the gatekeepers can substitute and backup mutually, therefore the same result can be achieved even if the subordinate gatekeepers or gateways is registered to any of the gatekeepers in the gatekeeper group. Wherein said gatekeepers in the gatekeeper group are connected to each other through a fully interconnected network.

According to the method of implementing IP telephone gatekeeper system of the present invention, two or more gatekeepers are connected to each other, so as to form a whole gatekeeper group which is regarded as a single gatekeeper system by the controlled gateways, in which the gatekeepers can substitute and backup mutually, said method mainly comprises the following steps:

1) synchronizing the data of the gatekeepers in the gatekeeper group is kept synchronous by means of synchronization, so that the data of the gatekeeper group is synchronous, therefore the gatekeeper group can be regarded as a single one.

2) transferring the status variation of the gateways controlled by the gatekeeper group among the gatekeepers in the gatekeeper group for synchronization by means of synchronization; so that any variation of gateway status (e.g., whether the gateway is online, whether the resources are available, etc.) will be informed among the gatekeepers. In this way, status information of gateways registered to the gatekeepers in the gatekeeper group may be obtained in time in subsequent call processing.

3) Mapping from a single gatekeeper name of the gatekeeper group to multi-gatekeepers in the gatekeeper group.

Wherein the synchronization means in step 1 comprises the following steps:

a. The gatekeepers in the gatekeeper group are connected to each other with a full interconnecting method into a network, in which the gatekeepers are connected to each other;

b. The data of the gatekeepers are synchronized dynamically to other gatekeepers in the gatekeeper group so that any data variation at a member of the gatekeeper group can be synchronized to other gatekeepers in time;

c. Certain data synchronization protocols are used among the gatekeepers (the data synchronization protocols involved in the present invention mainly include gatekeeper status synchronization protocol, data synchronization protocol, terminal status synchronization protocol, and synchronization detection protocol, etc.), so that the entire gatekeeper group works in coordination and any variation is transferred among the gatekeepers through the synchronization protocols to effectively avoid the waste of network bandwidth during data transmission;

d. Synchronization detection is performed among the gatekeepers periodically.

Wherein the periodical synchronization detection of the gatekeepers is implemented by the gatekeepers through generating a check code and comparing said check code to the data from a preconfigured dominate gatekeeper in the gatekeeper group; if any discrepancy is detected, the registered gateway being processed is transferred to another normal gatekeeper in the group instead of stopping the call; in addition, after the gateway is transferred, data synchronization with the dominate gatekeeper is performed automatically and the service is restarted after the synchronization.

The mapping from a single gatekeeper name to multi-gatekeepers according to step 3 is to represent the gatekeeper group with a common domain name so that the gatekeeper group is regarded as a single gatekeeper by the gateway (i.e., the gatekeeper group is transparent) and then the domain name is translated automatically into network transmission addresses of the gatekeepers through a domain name resolution system to implement automatic switchover to the gatekeeper, so that a list of transmission addresses of the gatekeepers can be obtained for the gatekeepers through the domain name resolution system.

In addition, the method of mapping from a single gatekeeper name to the gatekeepers comprises the following steps:

a. Before sending a GRQ message to a gatekeeper, the gateway obtains the list of gatekeeper addresses through the domain name resolution system, and chooses a gatekeeper with the highest priority to send the GRQ message according to the static priority sequence preconfigured in the Domain Name Server (DNS);

b. The gatekeeper that has received the GRQ message returns a list of available gatekeepers sorted by load with a Gatekeeper Confirm (GCF) message according to the load condition of the members in the gatekeeper group within a period;

c. The gateway chooses a gatekeeper with lower load to send a RRQ message to it according to the load condition of the list of available gatekeepers received.

With such a method, not only the mapping from a single gatekeeper domain name to multi-gatekeepers but also smooth changes of the gatekeeper group is implemented. Addition/removal of any gatekeeper to/from the gatekeeper group can be accomplished simply through adding/removing corresponding gatekeeper item to/from the domain name resolution server. In addition, the method is also advantageous for balanced registration to members of the gatekeeper group.

The invention claimed is:

1. A method of implementing an IP telephone gatekeeper system, wherein two or more gatekeepers are connected to each other, so as to form a whole gatekeeper group which is regarded as a single gatekeeper system by the controlled gateways, in which the gatekeepers can substitute and backup mutually, said method comprising the following steps:

1) synchronizing the data of the gatekeepers in the gatekeeper group by means of synchronization;

2) transferring the status variation of the gateways controlled by the gatekeeper group among the gatekeepers in the gatekeeper group for synchronization; and 3) mapping from a single gatekeeper name of the gatekeeper group to multi-gatekeepers in the gatekeeper group by:

a. before sending a Gatekeeper Request (GRQ) message to a gatekeeper, a gateway obtaining a list of gatekeeper addresses through a domain name resolution system, and choosing a gatekeeper with the highest priority to send the GRQ message according to the static priority sequence preconfigured in the Domain Name Server (DNS);

b. the gatekeeper that has received the GRQ message returning a list of available gatekeepers sorted by load with a Gatekeeper Confirm (GCF) message according to the load condition of the members in the gatekeeper group within a period; and c. the gateway choosing a gatekeeper with a lower load to send a Register Request (RRQ) message to it according to the load condition of the list of available gatekeepers received.

2. A method of implementing an IP telephone gatekeeper system according to claim 1, wherein said synchronization means in step 1) mainly comprises the following steps:

a. the gatekeepers in the gatekeeper group are connected to each other with a full interconnecting method into a network;

b. the data of the gatekeepers are synchronized dynamically to other gatekeepers in the gatekeeper group;

c. data synchronization protocols are used among the gatekeepers, for transferring the variation; and d. synchronization detection is performed among the gatekeepers periodically.

3. A method of implementing an IP telephone gatekeeper system according to claim 2, wherein the full interconnecting method in said step a is to connect the gatekeeper to each other.

4. A method of implementing an IP telephone gatekeeper system according to claim 2, wherein the periodical synchronization detection of the gatekeepers in said step d is implemented through generating a check code and comparing said check code to the data from a preconfigured dominate gatekeeper in the gatekeeper group; if any discrepancy is detected, data synchronization with the dominate gatekeeper is performed automatically and the service is restarted after the synchronization.

5. An IP telephone gatekeeper system that implements the method of implementing an IP telephone gateway system according to claim 1, wherein in the system two or more individual gatekeepers are connected to each other, so as to form a whole gatekeeper group which is regarded as a single gatekeeper system by the controlled gateways, and in which the gatekeepers can substitute and backup mutually.

6. A gatekeeper system according to claim 5, wherein said gatekeepers in the gatekeeper group are connected to each other with a full interconnecting method.

7. A method of implementing an IP telephone gatekeeper system, wherein two or more gatekeepers are connected to each other so as to form a whole gatekeeper group which is regarded as a single gatekeeper system by the controlled gateways, and in which the gatekeepers can substitute and backup mutually, said method comprising the following steps:

1) synchronizing the data of the gatekeepers in the gatekeeper group by means of synchronization;

2) transferring the status variation of the gateways controlled by the gatekeeper group among the gatekeepers in the gatekeeper group for synchronization;

3) mapping from a single gatekeeper name of the gatekeeper group to multi-gatekeepers in the gatekeeper group, wherein the mapping from a single gatekeeper name to multi-gatekeepers according to step 3) is to represent the gatekeeper group with a common domain name, which makes the gatekeeper group transparent, and then the domain name is translated automatically into network transmission addresses of the gatekeepers through a domain name resolution system to implement automatic switchover to the gatekeeper, so that a list of transmission addresses of the gatekeepers is obtained for the gatekeepers through the domain name resolution system, and wherein the mapping from a single gatekeeper name to multi-gatekeepers according to said step 3) is implemented mainly through the following steps:

a. before sending a Gatekeeper Request (GRQ) message to a gatekeeper, a gateway obtaining a list of gatekeeper addresses through the domain name resolution system, and choosing a gatekeeper with the highest priority to send the GRQ message according to the static priority sequence preconfigured in the Domain Name Server (DNS);

b. the gatekeeper that has received the GRQ message returning a list of available gatekeepers sorted by load with a Gatekeeper Confirm (GCF) message according to the load condition of the members in the gatekeeper group within a period; and c. the gateway choosing a gatekeeper with lower load to send a Register Request (RRQ) message to it according to the load condition of the list of available gatekeepers received.

* * * * *